United States Patent [19]

Corderoy et al.

[11] 4,253,619

[45] Mar. 3, 1981

[54] APPARATUS FOR HANDLING ELONGATE FLEXIBLE MATERIAL

[76] Inventors: Clive J. Corderoy, Karamea, Mungindi Rd.; Stanley E. Taylor, 15 Dobbie St., both of Moree, New South Wales, Australia

[21] Appl. No.: 50,333

[22] Filed: Jun. 20, 1979

[30] Foreign Application Priority Data

Jul. 6, 1978 [AU] Australia .............................. PD4984

[51] Int. Cl.³ ............................................ B65H 17/46
[52] U.S. Cl. ................................ 242/86.5 R; 242/86.2
[58] Field of Search .............. 242/86.5 R, 86.2, 86.52, 242/86; 254/166

[56] References Cited

U.S. PATENT DOCUMENTS

| 3,000,587 | 9/1961 | Goode | 242/86.5 R |
| 3,368,773 | 2/1968 | Linderman | 242/86.2 |
| 4,108,264 | 8/1978 | Tanaka | 254/166 |
| 4,148,445 | 4/1979 | Reynolds | 242/86.5 R |

*Primary Examiner*—Edward J. McCarthy
*Attorney, Agent, or Firm*—Stevens, Davis, Miller & Mosher

[57] ABSTRACT

Apparatus for handling elongate flexible material, particularly collapsible plastics irrigation piping is disclosed comprising a frame, a reel rotatably mounted to the frame, and means on the frame for driving the reel at variable speed. A guide roller is attached to the frame to be movable with respect to the reel under the action of tension in the material which, in operation, extends from the ground, around the roller and onto the reel. Means are provided responsive to the movement of the roller relative to the reel for varying the speed of the reel, thereby to maintain the tension on the material within predetermined limits.

9 Claims, 4 Drawing Figures

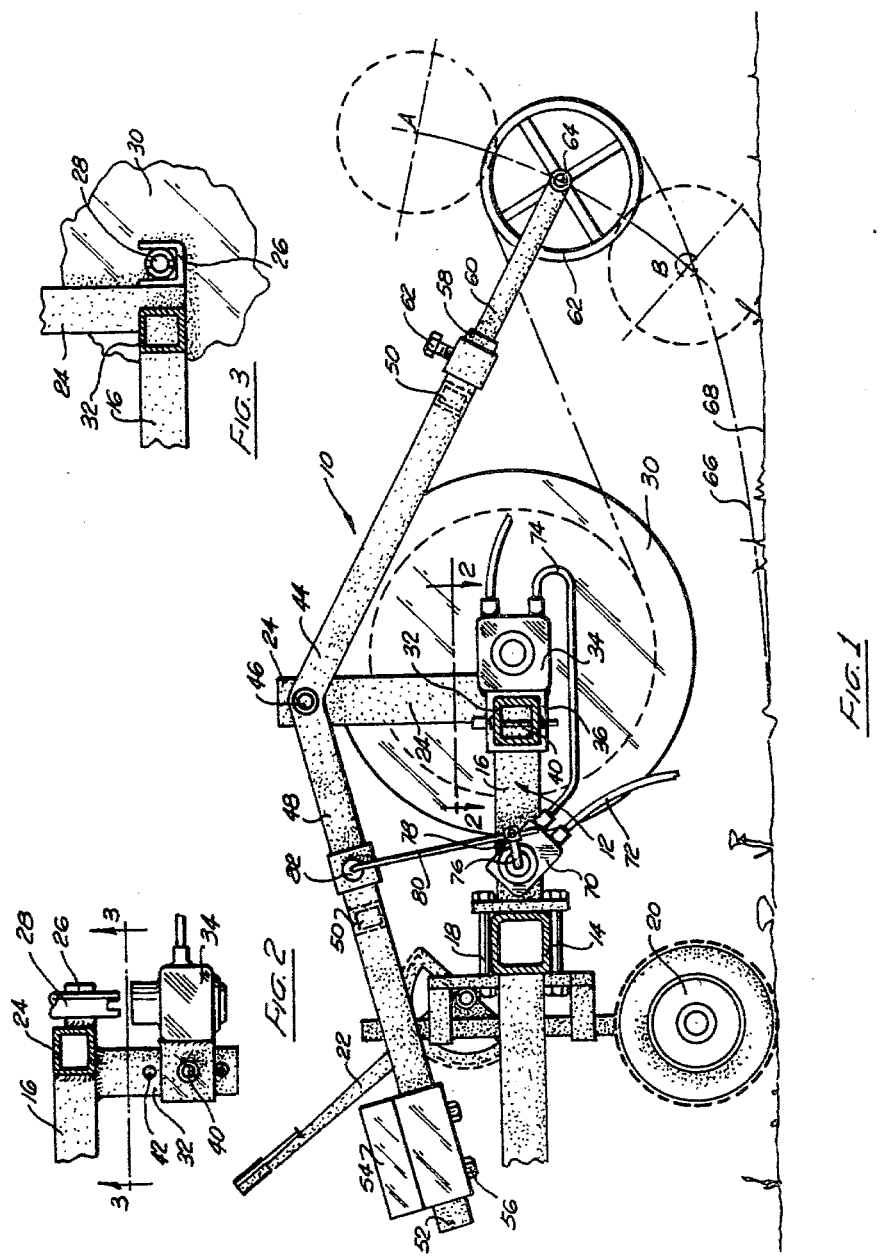

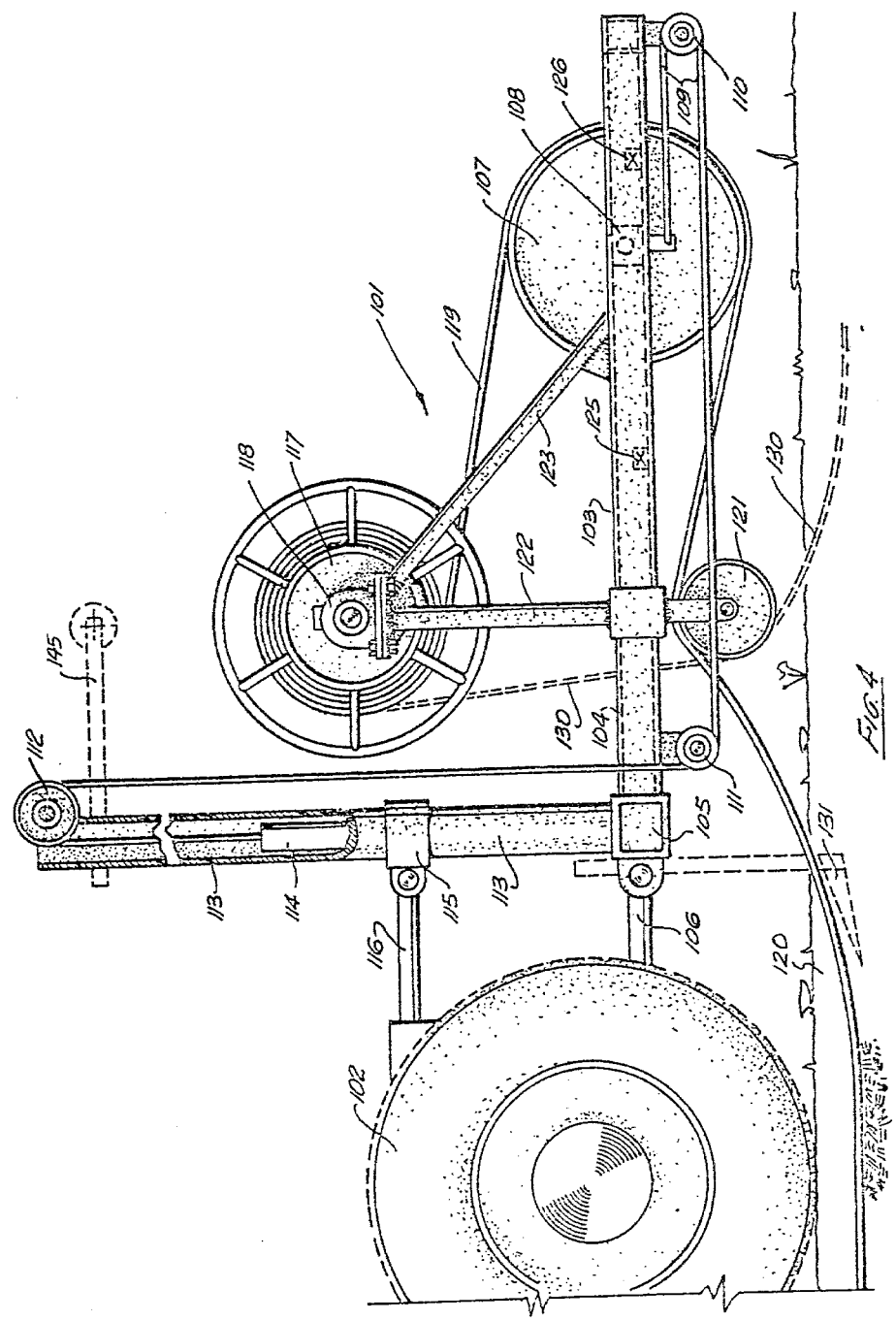

APPARATUS FOR HANDLING ELONGATE FLEXIBLE MATERIAL

The present invention relates to the handling of elongate flexible material. The invention is particularly well adapted for the retrieval of collapsible plastics irrigation piping and will be described hereinafter with reference to this field of use. It will be appreciated, however, that the invention is not limited to this particular application.

A relatively new technique in field irrigation involves the use of collapsible plastics piping having diameters in the order of two feet. Long lengths of this piping are laid in furrows to carry irrigation water to a plurality of tap-off means spaced along the pipe. Because of its flimsy nature, the laying and subsequent retrieval of this pipe poses particular difficulties in ensuring that the pipe is not damaged, for example, by the application of excessive tension while retrieving the collapsed piping onto a drum.

The present invention has been developed with the particular object of successfully retrieving collapsed plastic pipe but it may also be adapted for laying such pipe or handling other elongate flexible material where it is important to ensure that a predetermined maximum tension is not exceeded.

According to the invention there is provided apparatus for handling elongate flexible material comprising a frame, a reel rotatably mounted to said frame for reeling or unreeling said material, means on said frame for driving said reel at variable speed, a guide roller attached to said frame to be movable with respect to said reel under the action of tension in said material which, in operation, extends from the ground, around said roller and onto said reel, means responsive to said movement of said roller for varying the speed of said reel thereby to maintain the tension on said material within predetermined limits.

Preferably, the guide roller is rotatably mounted to a sub-frame which is hingedly mounted to the frame and the movement responsive means is responsive to hinged part-rotation of the sub-frame relative to the frame.

Two embodiments of the invention will now be described, by way of example only, with reference to the accompanying drawings in which:

FIG. 1 is a partly sectioned side elevation of one embodiment of a flexible pipe handling apparatus according to the invention;

FIG. 2 is a fragmentary view taken on line 2—2 of FIG. 1;

FIG. 3 is a fragmentary view taken on line 3—3 of FIG. 2; and

FIG. 4 is a partly sectioned side elevation of another embodiment of the invention.

Referring to FIGS. 1, 2 and 3 of the drawings, the pipe handling device 10 includes a frame 12 adapted for attachment to a horizontal tool bar 14 secured to a prime mover. The tool bar may be secured to the front, rear or side of the prime mover as the application may require.

The frame 12 is comprised of two substantially identical symmetrical halves, only one of which can be seen in FIG. 1. Each frame half includes a horizontal beam 16 provided at one end with suitable bracket mounting means 18 for securing it to the tool bar 14. The mounting means 18 may also support one of a pair of height adjustable wheels 20 for assisting in the support of the apparatus and adjusting its height from the ground by conventional lever means 22. The other end of each horizontal beam 16 is respectively connected to one of a pair of vertical pillars 24, each of which is provided with a channel or other suitable means 26 for removably supporting the projecting axle 28 of a reel 30. The reel 30 is thereby held between two generally L-shaped frame members in a symmetrical fashion.

One of the horizontal members 16 is provided with an axially extending post 32 which supports a hydraulic motor 34. The motor 34 is provided with a sleeve 36 which slides along the post 32 to engage or disengage the reel axle 28. The motor is secured in its driving position by a pin 40 which passes through the sleeve and engages with suitable hole formations 42 in the post 32.

A generally symmetrical sub-frame 44 is hingedly mounted to the pillars 24 to hinge about a horizontal axis 46 substantially parallel with the axis of the reel 30. The sub-frame 44 comprises a pair of spaced side arms 48 interconnected by spaced horizontal cross-beams 50. The forwardly extending limbs 52 of the side arms 48 are each provided with slidably mounted counterweights 54 which may be moved along each limb and locked in a selected position by bolts 56 or other suitable means.

The rearwardly extending limbs 58 of the side arms 48 are provided with extension pieces 60 which can slide within the limbs 58 and be locked in position by screw means 62. The extension pieces 60 support a guide roller 62 for rotation about a substantially horizontal axis 64. As the sub-frame 44 hinges, the guide roller can move between upper and lower limit positions A and B respectively.

In operation, assuming that the apparatus is to be used for retrieving collapsed plastics irrigation piping, the apparatus may be secured behind a tractor with its wheels and the adjustable wheels 20 straddling the collapsed piping 66. The piping extends from the ground 68, around the roller 62 and onto the reel 30 as shown.

As the apparatus traverses the field, the collapsed piping is drawn onto the reel by the hydraulic motor 34. The speed of this motor is controlled by means of a continuously adjustable valve 70 which is secured to the frame 12 and meters fluid from a supply line 72 to the motor feed line 74 in accordance with the position of a control lever 76. The control lever 76 is pivotally connected at its distal end 78 to a linkage 80 which is itself pivotally connected to the sub-frame 44 at 82. If the tractor velocity tends to become less than the linear velocity of the piping being wound onto the reel, the increase in pipe tension draws the roller 62 towards its lower limit position B, closer to the reel, as the sub-frame 44 hinges against the restoring action of the counterweights 54. As the sub-frame hinges, the limbs 52 rise, lifting the linkage 80 to rotate the valve control lever 76 in a counterclockwise sense, thereby reducing the flow of fluid to the hydraulic motor and dropping its speed. Under the action of the counterweights 54, the sub-frame then begins to hinge in the opposite direction and move the reel 62 towards its upper limit position A. As this occurs, the valve control lever is rotated in a clockwise sense thereby to increase the fluid flow to the motor for a corresponding increase in reel velocity. This then tends to restore the sub-frame to an equilibrium position.

It can therefore be seen that the arrangement provides a stable negative feedback loop tending to maintain a constant reeling tension on the piping with the sub-frame always tending towards a position of equilibrium depending upon the selected position of the counterweights.

The apparatus can also be used to lay the piping simply by reversing the direction of the prime mover and allowing the reel to run free. The apparatus can also be used in conjunction with a tyne (not shown) secured to the frame and adapted to dig a shallow furrow some three to four inches deep to receive the piping as it unwinds from the reel.

In other embodiments, the guide roller may be slidably mounted to the frame rather than hingedly mounted as in the case described above. In such an alternative form, limit switches may be provided at the extremities of slide travel of the roller axis to stop or start a constant speed reel drive motor as required. Such an embodiment is illustrated in FIG. 4.

Referring to FIG. 4, the apparatus 101 of this embodiment is adapted for attachment behind a towing tractor 102 by the conventional top and bottom link attachment provisions. The apparatus is constructed around a substantially U-shaped cantilevered frame 103 having its longitudinally extending limbs 104 connected at their forward ends to a transversely extending support frame 105. The support frame 105 is rigidly connected to the two bottom links 106 and the top link 116 of the tractor hitching arrangement.

Located between the longitudinal limbs 104 and spaced from the ground is a tensioning drum or roller 107 which is supported for rotation about a transversally extending axle 108. The limbs 104 are in channel form with two side flanges directed inwardly such that the opposite ends of the axle 108 can locate between these side flanges and slide along the members 104. The side flanges are also provided with inwardly directed sub-flanges along their distal edges which serve to retain the axle ends against withdrawal from the channel.

The opposite ends of the axle 108 are also respectively connected to a pair of tensioning cables 109. Each cable 109 passes over a rear pulley 110 and then extends forwardly, around another pulley 111 and then to a final pulley 112 secured at the top of a vertically extending pipe 113. Located within each of the two pipes 113 is a weight 114 to which each cable is attached thereby to apply a constant, predetermined force to the drum axle 108 tending to move it towards the rear of the apparatus. The two pipes 113 form an integral part of the frame 105 and are spaced apart by a cross-beam 115, to the mid-point of which the tractor top link 116 is connected.

Mounted above and forwardly of the tensioning drum 107 is a winch reel 117. The winch reel is driven by a constant speed electric motor 118 to wind-up the collapsed plastics piping 119. In the illustrated configuration, the piping 119 extends from its furrow 120 up and over a support roller 121 which permits water to drain forwardly out of the pipe. From the roller 121 the collapsed piping passes around the tensioning drum 107 and up to the winch reel supported above the frame 104 by vertical posts 122 and inclined bracing members 123.

As the tractor moves forward in the direction indicated it will be apparent that the weights 114 will apply a predetermined rearward tensioning force to the piping as the constant speed winch 118 winds the piping onto the winch reel 117. If the forward speed of the tractor should fall below the rate at which the piping is being wound onto the winch reel 117, the winch will tend to move the tensioning drum forward along the limbs 104, against the force imposed by the weights 114. This applied force is, however, constant and so the tension applied to the piping cannot exceed this predetermined amount while the drum is free to move along the limbs 104.

Should the tractor speed fall below its optimum retrieval rate the drum will move forwardly for the entire distance provided by the limbs 104 until contact is made with a micro-switch 125 located at a position corresponding to the limit of this forward travel. The micro-switch 125 then acts through a conventional relay circuit to de-activate the winch motor 118 and stop the reel 117 such that the relative forward motion of the tensioning drum is arrested. Continued forward motion of the tractor will then cause the drum to move in a rearward direction along the limbs 104 under the influence of the weights 114 until such time as contact is made with a further micro-switch 126 located at a position corresponding to the rearmost limit of drum travel. Actuation of this micro-switch 126 re-starts the winch motor and the winding process continues.

It is, therefore, apparent that the tractor can successfully retrieve the piping over a range of speeds determined by the spacing of the two micro-switches. The maximum constant speed, of course, being determined by the speed of the motor 118. Provided that the tractor remains within this speed range the piping will be retrieved under a constant and predetermined tension. This tension cannot be exceeded regardless of tractor speed but if the speed is excessive, the tension can drop below the predetermined value as slack piping builds up behind the drum. A reduction in tension is, however, not as serious as the application of excessive tension.

Appropriate signalling devices can be provided to alert the driver if his speed should move above or below that determined by the spacing of the micro-switches. For example, a horn could be activated by micro-switch 126 to indicate that the tractor is moving too quickly.

The invention may also be adapted for laying the piping and to this end, a tyne 131 can be secured beneath the transverse frame member 105. The tyne is adapted to dig a shallow furrow some 3 to 4 inches deep to receive the piping as it unwinds from the drum 117. In this case, the winch is de-activated or de-clutched and the piping unwound around the roller 121 as indicated by the dotted path 130.

Preferably, one or both of the pipes 113 includes a jib 145 which can be used to lift a full reel of piping to or from the winch stand and a holding stand provided on one or both sides of the frame 105.

Although the invention has been described with reference to specific examples and a particular application, it will be appreciated by those skilled in the art that the invention may be embodied in many other forms without departing from the scope of the inventive concept.

We claim:

1. Apparatus for handling elongate flexible material comprising a frame, a reel rotatably mounted to said frame, means on said frame for driving said reel at variable speed, a guide roller attached to a sub-frame hingedly mounted to said frame to be movable with respect to said reel under the action of tension in said material which, in operation, extends from the ground, around said roller and onto said reel, means responsive to hinged partial rotation of said sub-frame relative to said frame for varying the speed of said reel thereby to maintain the tension on said material within predetermined limits.

2. Apparatus according to claim 1 wherein said subframe is provided with adjustable counter-balance weights for varying the permissable tension applied to said material.

3. Apparatus according to claim 2 wherein said reel speed is continuously variable.

4. Apparatus according to claim 3 wherein said driving means includes an hydraulic motor controlled by a valve actuated by hinged partial rotation of said subframe to increase motor speed as said roller moves away from said reel and decrease motor speed as said roller moves toward said reel.

5. Apparatus according to claim 1 wherein said frame is adapted for attachment behind a prime mover.

6. Apparatus according to claim 1 wherein said frame is adapted for attachment in front of a prime mover.

7. Apparatus according to claim 1 wherein said frame is adapted for attachment beside a prime mover.

8. Apparatus according to claim 1 wherein said frame is provided with adjustable wheel means for varying the height of said frame above the ground.

9. Apparatus according to claim 1 wherein said subframe is hingedly mounted to said frame for movement about an axis spaced above and substantially parallel with the axes of said reel.

* * * * *